US012601428B2

(12) United States Patent
Larson et al.

(10) Patent No.: US 12,601,428 B2
(45) Date of Patent: Apr. 14, 2026

(54) METER SWIVEL NUT

(71) Applicant: Mueller International, LLC, Atlanta, GA (US)

(72) Inventors: Ryan Fairchild Larson, Decatur, IL (US); James Webber, Decatur, IL (US); Celia Kaye Atherton, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 103 days.

(21) Appl. No.: 18/386,197

(22) Filed: Nov. 1, 2023

(65) Prior Publication Data

US 2025/0137481 A1     May 1, 2025

(51) Int. Cl.
*F16L 19/02*     (2006.01)
*F16B 37/16*     (2006.01)

(52) U.S. Cl.
CPC .......... *F16L 19/0206* (2013.01); *F16B 37/16* (2013.01); *F16L 19/0212* (2013.01)

(58) Field of Classification Search
CPC ..... F16L 19/00; F16L 19/005; F16L 19/0206; F16L 19/0225; F16L 19/0212; F16B 37/16
USPC .......................................... 285/38, 354, 386
See application file for complete search history.

(56) References Cited

U.S. PATENT DOCUMENTS

| | | | |
|---|---|---|---|
| 1,526,301 A * | 2/1925 | Stevens ................. | F16B 41/005 |
| | | | 324/156 |
| 1,762,065 A * | 6/1930 | Lally ..................... | F16L 37/101 |
| | | | 285/38 |

| | | | |
|---|---|---|---|
| 1,876,751 A * | 9/1932 | Reedy ..................... | F16L 29/00 |
| | | | 251/210 |
| 2,438,107 A * | 3/1948 | Babbitt ................. | F16L 37/088 |
| | | | 285/332 |
| 2,484,755 A * | 10/1949 | Smith ..................... | G01F 15/18 |
| | | | 285/38 |
| 2,733,937 A * | 2/1956 | Mowrer, Jr. ............ | F16L 19/00 |
| | | | 285/39 |
| 3,113,792 A * | 12/1963 | Brown ................ | F16L 19/0231 |
| | | | 285/388 |
| 4,775,008 A * | 10/1988 | Cameron ............ | F16L 19/0231 |
| | | | 166/85.1 |
| 4,872,338 A * | 10/1989 | Rivero-Olmedo .... | G01F 15/185 |
| | | | 73/201 |
| 5,003,821 A | 4/1991 | Rivero-Olmedo | |
| 5,435,179 A * | 7/1995 | Sands ..................... | G01F 15/18 |
| | | | 285/31 |
| 5,588,682 A * | 12/1996 | Breese .................. | F16L 25/023 |
| | | | 285/55 |
| 6,581,593 B1 * | 6/2003 | Rubin ................. | F16L 19/0286 |
| | | | 128/911 |
| D600,546 S | 9/2009 | Scilingo et al. | |
| 7,854,165 B2 | 12/2010 | Ball et al. | |
| D702,543 S | 4/2014 | Bell | |

(Continued)

*Primary Examiner* — David Bochna

(74) *Attorney, Agent, or Firm* — Taylor Duma LP

(57) ABSTRACT

A spoked swivel nut includes a nut body defining an inner nut surface, an outer nut surface, a nut front end, and a nut rear end opposite the nut front end, the nut inner surface defining a nut bore extending from the nut front end to the nut rear end, the nut inner surface further defining an annular ring groove proximate to the nut rear end and internal threading proximate to the nut front end; and a plurality of manually-engageable handle spokes extending radially outward from the nut body.

21 Claims, 12 Drawing Sheets

(56)     References Cited

U.S. PATENT DOCUMENTS

| | | | |
|---|---|---|---|
| 9,109,727 B1 * | 8/2015 | Madson | .............. F16L 19/0218 |
| D762,439 S | 8/2016 | Bertani | |
| 9,664,550 B2 | 5/2017 | Cole | |
| D798,129 S | 9/2017 | Bertani | |
| D813,639 S | 3/2018 | Osanai | |
| 10,393,294 B2 * | 8/2019 | Ungchusri | .......... F16L 19/0218 |
| D882,388 S | 4/2020 | Schramm et al. | |
| D882,389 S | 4/2020 | Schramm et al. | |
| 10,808,871 B2 * | 10/2020 | Nguyen | ................ E21B 17/042 |
| D959,255 S | 8/2022 | Schramm et al. | |
| 2017/0363232 A1 * | 12/2017 | Varnado | .............. B25B 13/5091 |
| 2021/0270308 A1 * | 9/2021 | Riedel, Jr. | ............... F16B 37/16 |
| 2023/0273056 A1 | 8/2023 | Sitnikov et al. | |

* cited by examiner

METER SWIVEL NUT

TECHNICAL FIELD

This disclosure relates to water metering. More specifically, this disclosure relates to a meter swivel nut for
connecting a water meter to a piping system.

BACKGROUND

Meter installation typically requires the use of wrenches
to tighten meter swivel nuts onto the meter. However, it can
be difficult to operate the wrench within tight, confined
spaces, such as meter yard boxes. Additionally, using a
wrench to tighten the meter swivel nut can create over-torque that can damage the meter.

SUMMARY

It is to be understood that this summary is not an extensive
overview of the disclosure. This summary is exemplary and
not restrictive, and it is intended neither to identify key or
critical elements of the disclosure nor delineate the scope
thereof. The sole purpose of this summary is to explain and
exemplify certain concepts of the disclosure as an introduction to the following complete and extensive detailed
description.

Disclosed is a spoked swivel nut comprising a nut body
defining an inner nut surface, an outer nut surface, a nut front
end, and a nut rear end opposite the nut front end, the nut
inner surface defining a nut bore extending from the nut
front end to the nut rear end, the nut inner surface further
defining an annular ring groove proximate to the nut rear end
and internal threading proximate to the nut front end; and a
plurality of manually-engageable handle spokes extending
radially outward from the nut body.

Also disclosed is a meter valve assembly comprising a
meter valve defining an inlet end and an outlet end opposite
the inlet end; and a spoked meter swivel nut mounted to the
inlet end of the meter valve and comprising a nut body and
a plurality of manually-engageable handle spokes, the nut
body defining an inner nut surface and an outer nut surface,
the inner nut surface defining a nut bore extending from a
nut front end to a nut rear end, the outlet end of the meter
valve engaging the nut bore at the nut rear end, the plurality
of manually-engageable handle spokes extending radially
outward from the nut body; wherein the manually-engage-
able handle spokes are configured to be manually gripped to
rotate the spoked meter swivel nut on the outlet end of the
meter valve.

Also disclosed is a method of coupling a meter valve to
a meter, the method comprising mounting a spoked meter
swivel nut to a valve outlet end of the meter valve, the valve
outlet end engaging a nut bore of the spoked meter swivel
nut at a nut rear end of the spoked meter swivel nut;
receiving a meter inlet end of the meter within the nut bore
at a nut front end of the spoked meter swivel nut opposite the
nut rear end, wherein the meter inlet end defines external
threading configured to mate with internal threading of the
spoked meter swivel nut; manually gripping at least one
manually-engageable handle spoke of the spoked meter
swivel nut; and manually rotating the spoked meter swivel
nut to tighten the spoked meter swivel nut on the meter inlet
end of the meter.

Various implementations described in the present disclosure may include additional systems, methods, features, and
advantages, which may not necessarily be expressly disclosed herein but will be apparent to one of ordinary skill in
the art upon examination of the following detailed descrip-
tion and accompanying drawings. It is intended that all such
systems, methods, features, and advantages be included
within the present disclosure and protected by the accom-
panying claims.

BRIEF DESCRIPTION OF THE DRAWINGS

The features and components of the following figures are
illustrated to emphasize the general principles of the present
disclosure. Corresponding features and components
throughout the figures may be designated by matching
reference characters for the sake of consistency and clarity.

DETAILED DESCRIPTION

Figures 1, 2:
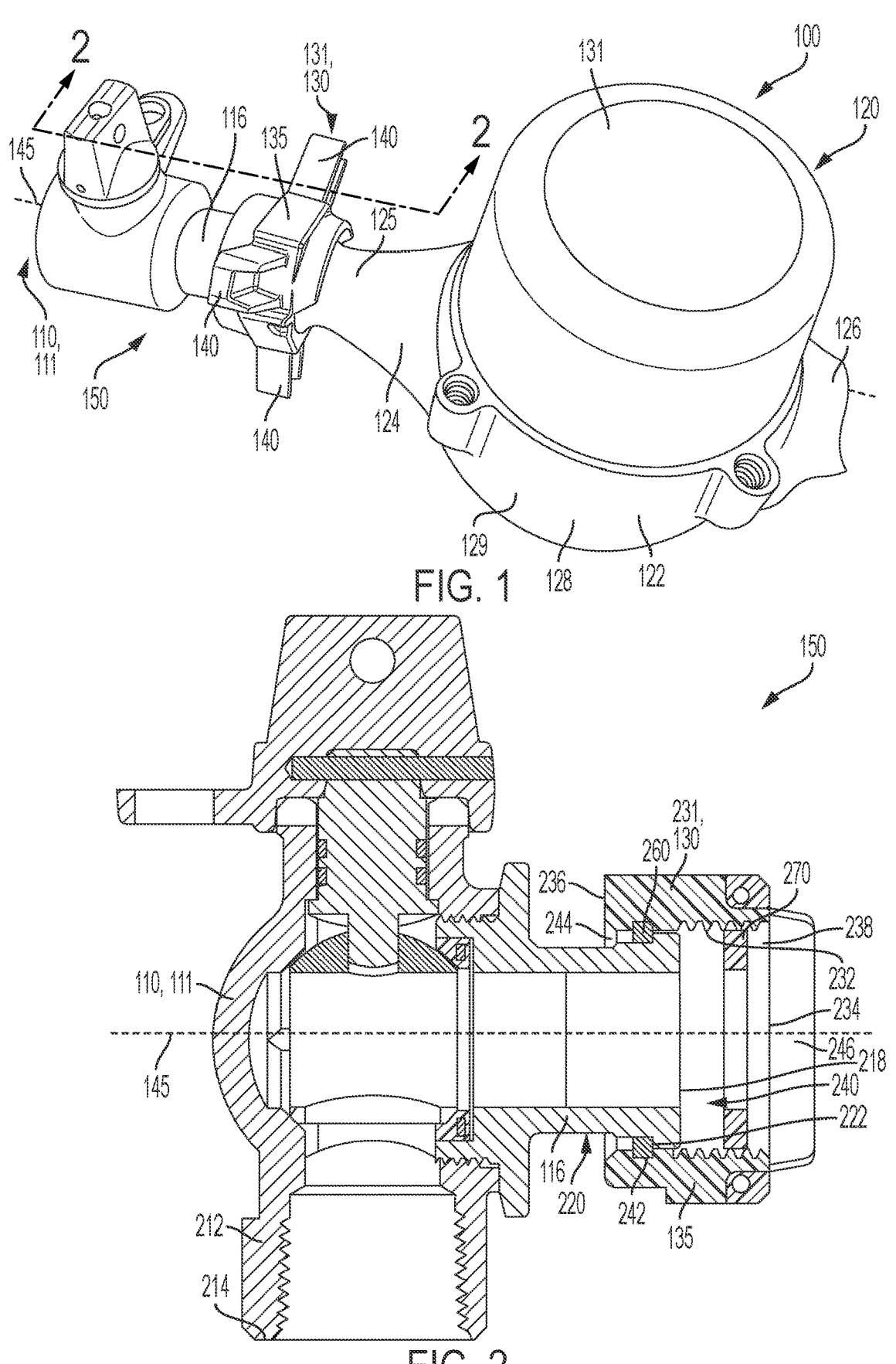
FIG. 1 is a perspective view of a meter assembly com-
prising portions of a water meter and a meter valve con-
nected to the water meter by a meter swivel nut, in accor-
dance with one aspect of the present disclosure.
FIG. 2 is a cross-sectional view of a valve assembly of the
meter assembly, in accordance with another aspect of the
present disclosure, wherein the valve assembly comprises
the meter valve and the meter swivel nut, the cross-sectional
taken along a line similar in orientation to line 2-2 of FIG.
1.

The present disclosure can be understood more readily by
reference to the following detailed description, examples,
drawings, and claims, and the previous and following
description. However, before the present devices, systems,
and/or methods are disclosed and described, it is to be
understood that this disclosure is not limited to the specific
devices, systems, and/or methods disclosed unless otherwise
specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a meter swivel nut and associated methods, systems, devices, and various apparatus. Example aspects of the meter swivel nut can comprise a plurality of manually-engageable handle spokes for manually tightening the meter swivel nut. It would be understood by one of skill in the art that the meter swivel nut is described in but a few exemplary embodiments among many. No particular terminology or description should be considered limiting on the disclosure or the scope of any claims issuing therefrom.

FIG. 1 is a perspective view of a meter assembly 100, in accordance with one aspect of the present disclosure. The meter assembly 100 can comprise a meter valve 110 and a meter 120. In the present aspect, only a main case 122 of the meter 120 is illustrated. However, example aspects of the meter 120 can also include a water meter register and a cap, and the water meter register can be enclosed by the main case 122 and the cap. The meter assembly 100 can further comprise a meter swivel nut 130 connecting the meter valve 110 to the meter 120. In other aspects, the meter swivel nut 130 can connect the meter 120 to any other suitable device, including but not limited to, a plumber valve, a check valve, a meter tail, a meter coupling elbow, or the like. In other aspects, the swivel nut 130 can connect any two suitable piping devices together. According to example aspects, the meter assembly 100 can be connected to a pipeline system carrying fluid therethrough. The pipeline system can be, for example, a municipal water pipeline system carrying water to commercial or residential buildings. The meter 120 of the meter assembly 100 can measure a flow rate of the water or other fluid through the meter assembly 100. In other aspects, the pipeline system can be any other suitable type of pipeline system, and the meter 120 can measure the flow rate any other suitable fluid, including liquids and gases, therethrough. Examples of such meter valves 110 and meters 120 are disclosed in U.S. Pat. No. 7,854,165, which issued on Dec. 21, 2010, U.S. Pat. No. 9,664,550, which issued on May 30, 2017, and U.S. application Ser. No. 17/683,111, filed on Feb. 28, 2022, each of which is hereby specifically incorporated by reference herein in its entirety.

The main case 122 of the meter 120 can define a flow tube 124, and the meter valve 110 can control the flow of fluid from the pipeline system into the flow tube 124. In the present aspect, the meter valve 110 can be a ball angle meter valve 111; however, in other aspects, the meter valve 110 can be any other suitable type of valve known in the art. The meter valve 110 can define a valve inlet portion 212 (shown in FIG. 2) terminating at a valve inlet end 214 (shown in FIG. 2) and a valve outlet portion 116 terminating at a valve outlet end 218 (shown in FIG. 2) opposite the valve inlet end 214. The flow tube 124 can define a meter inlet portion 125 and a meter outlet portion 126 opposite the meter inlet portion 125. A meter housing 128 of the main case 122 can be disposed between the meter inlet portion 125 and the meter outlet portion 126. The meter inlet portion 125 of the flow tube 124 can be coupled to the valve outlet end 218 of the meter valve 110 by the meter swivel nut 130. In other aspects, the meter swivel nut 130 can couple any other suitable device to either the meter inlet portion 125 or the meter outlet portion 126. The meter valve 110 can be selectively opened to allow fluid to flow through the flow tube 124 and closed to prohibit fluid from flowing through the flow tube 124. More specifically, in an open position of the meter valve 110, fluid can flow through the meter valve 110 from the valve inlet end 214 to the valve outlet end 218 and can flow into the flow tube 124 through the meter inlet portion 125. In a closed position of the meter valve 110, the fluid is blocked from flowing through the meter valve 110 and into the flow tube 124. A flow axis 145 can extend centrally through the valve outlet end 218 of the meter valve 110, the meter swivel nut 130, and the meter inlet portion 125 of the flow tube 124, as shown.

According to example aspects, the meter swivel nut 130 can be mounted to the valve outlet end 218 of the meter valve 110, and the meter swivel nut 130 and the meter valve 110 can together define a valve assembly 150. For example, in the present aspect, the meter swivel nut 130 can be mounted to the valve outlet end 218 by a snap ring 260 (shown in FIG. 2), as shown and described in further detail with respect to FIG. 2. The meter swivel nut 130 can then be selectively coupled to the meter inlet portion 125 of the flow tube 124 by rotatably threading the meter swivel nut 130 onto the meter inlet portion 125. For example, the meter swivel nut 130 can define internal threading 232 (shown in FIG. 2) configured to mate with external threading on the meter inlet portion 125 of the meter 120. In the present aspect, the meter swivel nut 130 can be a spoked meter swivel nut 131. The spoked meter swivel nut 131 can define a central nut body 135 and a plurality of manually-engageable handle spokes 140 extending substantially radially outward from the nut body 135, relative to the flow axis 145. In the present aspect, the spoked meter swivel nut 131 can comprise three of the handle spokes 140; however, in other aspects, the spoked meter swivel nut 131 can comprise more or fewer handle spokes 140.

When installing the valve assembly 150 with the meter 120, an installer can manually grip the handle spokes 140 of the spoked meter swivel nut 131 and can rotate the spoked meter swivel nut 131 to tighten the spoked meter swivel nut 131 onto the meter inlet portion 125 of the meter 120. In the present aspect, the handle spokes 140 can be monolithically formed (i.e., formed a singular component that constitutes a single material without joints or seams) with the nut body 135. In other aspects, such as the aspect depicted in FIGS. 2-8, the handle spokes 140 can be formed as part of a separate tightening adaptor 500 (shown in FIG. 5) that can be selectively engaged with a standard type meter swivel nut 231 (shown in FIG. 2) to allow the standard type meter swivel nut 231 to be manually tightened.

Example aspects of the meter swivel nut 130 can comprise a metal material, such as brass for example and without limitation. In other aspects, the meter swivel nut 130 can comprise any other suitable metal material, such as steel (e.g., stainless steel) or brass alloys, or any suitable non-metal material or combination of materials. Moreover, example aspects of the meter swivel nut 130 can be manufactured by a casting process. That is, the meter swivel nut 130 can be formed from a molten material, such as a molten brass material, poured into a pre-shaped mold. In other aspects, the meter swivel nut 130 can be manufactured by any other suitable manufacturing process known in the art, such as forging, for example and without limitation.

FIG. 2 illustrates a cross-sectional view of the valve assembly 150 comprising the meter valve 110 and the meter swivel nut 130 according to another example aspect of the disclosure. The meter valve 110 of the present aspect can be another example aspect of a ball angle meter valve 111. The cross-sectional view of the present ball angle meter valve 111 can be taken along a line similar in orientation to the line 2-2 shown in FIG. 1. The meter valve 110 is shown in the open position, wherein fluid can flow through the meter valve 110 from the valve inlet end 214 to the valve outlet end 218. As shown, the meter swivel nut 130 can be mounted on the valve outlet end 218 for connecting the valve outlet end 218 to the meter inlet portion 125 of the meter 120 (both shown in FIG. 1). The meter swivel nut 130 can be the standard type meter swivel nut 231 in the present aspect. That is, the meter swivel nut 130 of the present aspect can comprise the nut body 135, but does not comprise the handle spokes 140 (shown in FIG. 1) formed integrally therewith. Rather, the separate tightening adaptor 500 (shown in FIG. 5) comprising the handle spokes 140 can be provided for manually tightening the standard type meter swivel nut 231 onto the meter inlet portion 125.

According to example aspects, the meter swivel nut 130 can define a nut front end 234 and a nut rear end 236 opposite the nut front end 234. An inner nut surface 238 of the nut body 135 of the meter swivel nut 130 can define a nut bore 240 extending therethrough from the nut front end 234 to the nut rear end 236. The flow axis 145 can extend centrally through the nut bore 240, as shown. The valve outlet end 218 of the meter valve 110 can extend into the nut bore 240 at nut rear end 236, and the meter swivel nut 130 can be secured to the valve outlet end 218 by the snap ring 260. As shown, the meter valve 110 can define an outer valve surface 220. The snap ring 260 can substantially encircle the meter valve 110 proximate to the valve outlet end 218, and the outer valve surface 220 can define a stop shoulder 222 at the valve outlet end 218 to prevent the snap ring 260 from sliding off the valve outlet end 218. The inner nut surface 238 of the meter swivel nut 130 can define an annular ring groove 242 proximate to the nut rear end 236, and the snap ring 260 can engage the annular ring groove 242 to retain the meter swivel nut 130 on the valve outlet end 218 of the meter valve 110. In some aspects, the inner nut surface 238 can further define an annular chamfer 244 at the nut rear end 236 to facilitate inserting the valve outlet end 218 into the nut bore 240.

The meter inlet portion 125 of the meter 120 can be inserted into the nut bore 240 of the meter swivel nut 130 through the nut front end 234. According to example aspects, the inner nut surface 238 can define the internal threading 232 between the nut front end 234 and the annular ring groove 242. As previously described, the meter inlet portion 125 can define external threading that can mate with the internal threading 232 of the meter swivel nut 130. As the meter swivel nut 130 is manually rotated by manually gripping and rotating the handle spokes 140, the threaded engagement between the meter swivel nut 130 and the meter inlet portion 125 can allow the meter swivel nut 130 to be tightened and advanced forward along the meter inlet portion 125. As the meter swivel nut 130 advances forward, the meter inlet portion 125 of the meter 120 and the valve outlet end 218 of the meter valve 110 can be drawn towards each other. In example aspects, an annular gasket 270 can be disposed within the nut bore 240 between the meter inlet portion 125 and the valve outlet end 218.

The meter swivel nut 130 can be suitably tightened when the annular gasket 270 is compressed between the meter inlet portion 125 and the valve outlet end 218 to create a fluid-tight seal therebetween. One benefit of manually tightening the meter swivel nut 130, as opposed to tightening with a wrench or other tool, is that manual tightening reduces the likelihood of damaging the meter 120 from over-torque of the meter swivel nut 130. Additionally, manually tightening the meter swivel nut 130 can be both faster and easier than tightening with a wrench or other tool, particularly when installing the meter valve 110 within a confined area, such as a meter yard box.

In some aspects, the meter swivel nut 130 can comprise a curved or arcuate lip 246 extending axially forward from the nut front end 234, as shown. Such meter swivel nuts 130 comprising the arcuate lip 246 can be referred to as saddle nuts. According to example aspects, the arcuate lip 246 can aid in guiding the meter inlet portion 125 of the meter 120 into the nut bore 240 of the meter swivel nut 130 at the nut front end 234 thereof. Additionally, in some aspects, the internal threading 232 can extend forward beyond the nut front end 234 to further be formed on the arcuate lip 246. Other aspects of the arcuate lip 246 may not comprise the internal threading 232. In the present aspect, the arcuate lip 246 can at least partially encircle the nut bore 240 of the meter swivel nut 130, and more specifically, the arcuate lip can extend about halfway around the nut bore 240. In other aspects, the arcuate lip 246 can extend more or less than halfway around the nut bore 240. Furthermore, other aspects of the meter swivel nut 130 may or may not comprise the arcuate lip 246.

Figure 3:
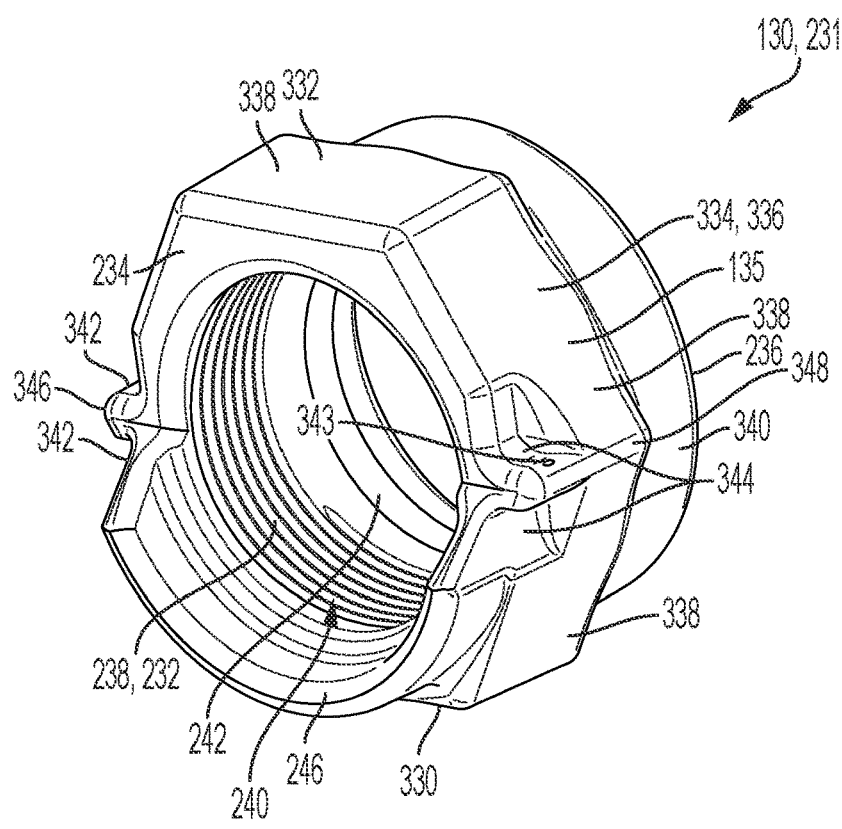
FIG. 3 is a front perspective view of the meter swivel nut
of FIG. 2.
Figure 4:
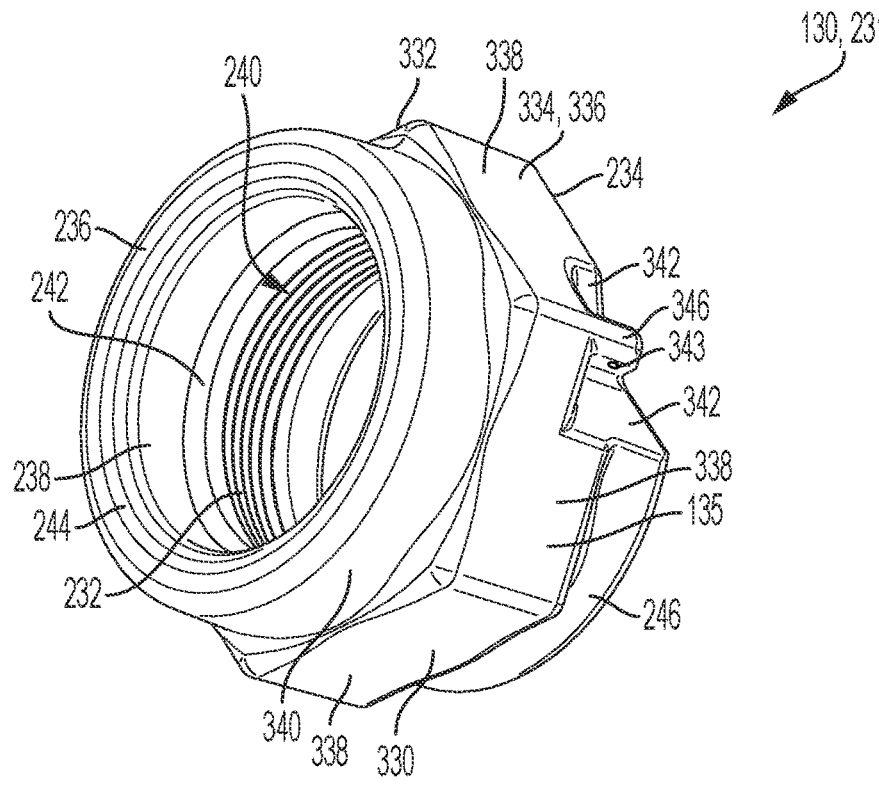
FIG. 4 is a rear perspective view of the meter swivel nut
of FIG. 2.

FIGS. 3 and 4 illustrate front and rear perspective views, respectively, of the standard type meter swivel nut 231. As shown, the meter swivel nut 130 can define the nut front end 234 and the nut rear end 236. The inner nut surface 238 of the meter swivel nut 130 can define the nut bore 240 extending from the nut front end 234 to the nut rear end 236. The inner nut surface 238 can also define the annular ring groove 242 proximate to the nut rear end 236 and extending radially outward relative to the flow axis 145 (shown in FIG. 1). Additionally, the annular chamfer 244 (shown in FIG. 4) can be defined by the inner nut surface 238 at the nut rear end 236. The inner nut surface 238 can further define the internal threading 232 between the nut front end 234 and the annular ring groove 242. In some aspects, as shown, the meter swivel nut 130 can also comprise the arcuate lip 246 extending axially forward from the nut front end 234. The arcuate lip 246 can be formed at a bottom nut end 330 of the meter swivel nut 130 in the present aspect, opposite a top nut end 332 of the meter swivel nut 130. In other aspects, the arcuate lip 246 can be formed at any other suitable location.

According to example aspects, an outer nut surface 334 of the nut body 135 of the meter swivel nut 130 can define a substantially hexagonal adaptor portion 336 and a substantially cylindrical extension portion 340 extending from the substantially hexagonal adaptor portion 336. The substantially cylindrical extension portion 340 can be disposed at the nut rear end 236, and the substantially hexagonal adaptor portion 336 can extend between the substantially cylindrical extension portion 340 and the nut front end 234. The substantially hexagonal adaptor portion 336 of the outer nut surface 334 can define six substantially planar outer side faces 338, as shown. The tightening adaptor 500 (shown in FIG. 5) can engage the substantially hexagonal adaptor portion 336 to allow for manual tightening of the meter swivel nut 130 via the handle spokes 140 (shown in FIG. 1), as described in further detail below. Additionally, in some aspects, the substantially hexagonal adaptor portion 336 can also be engaged by a wrench or other tool for tightening the

Figure 12:
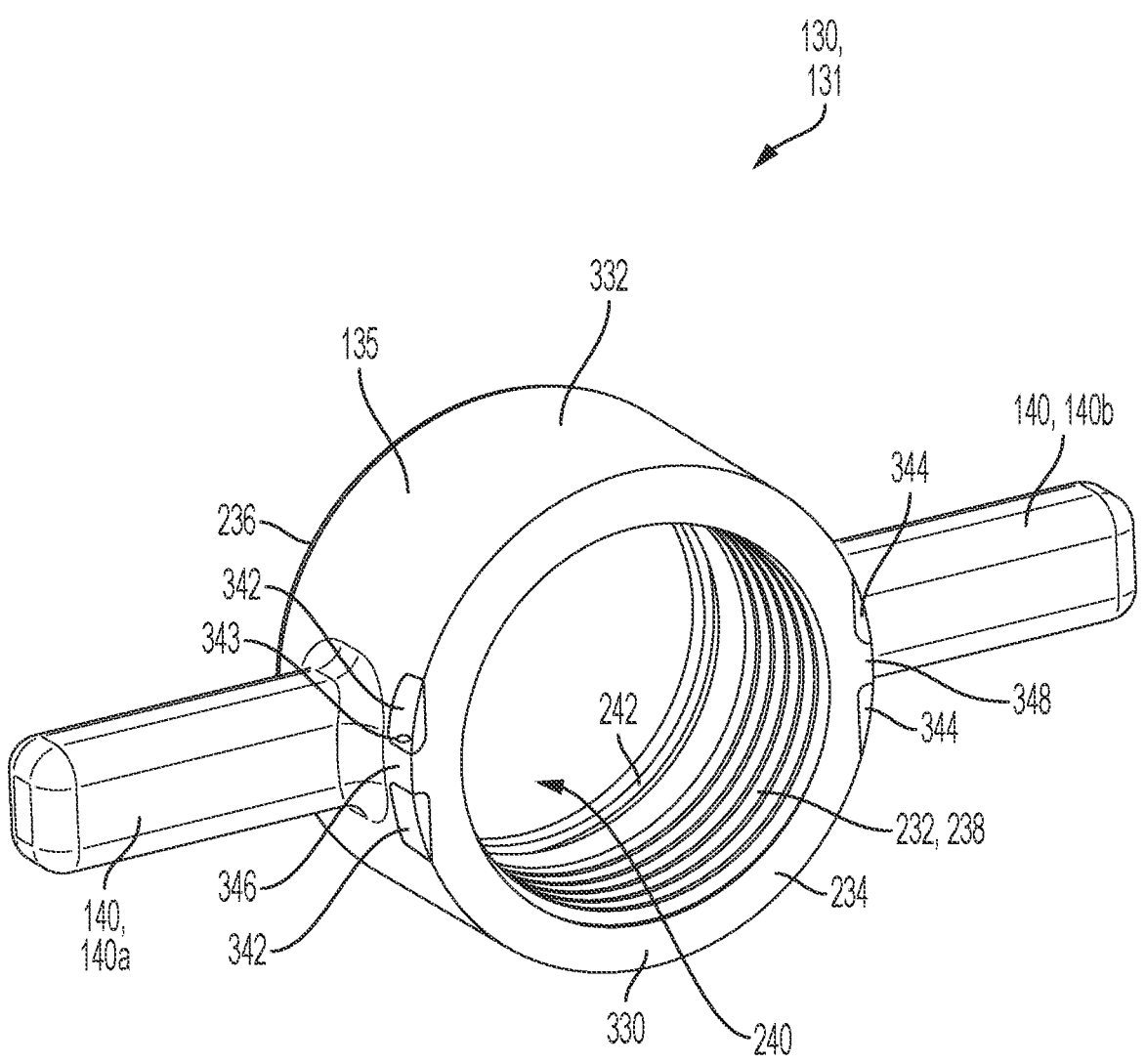
FIG. 12 is a front perspective view of the meter swivel
nut, in accordance with another aspect of the present dis-
closure.
Figure 13:
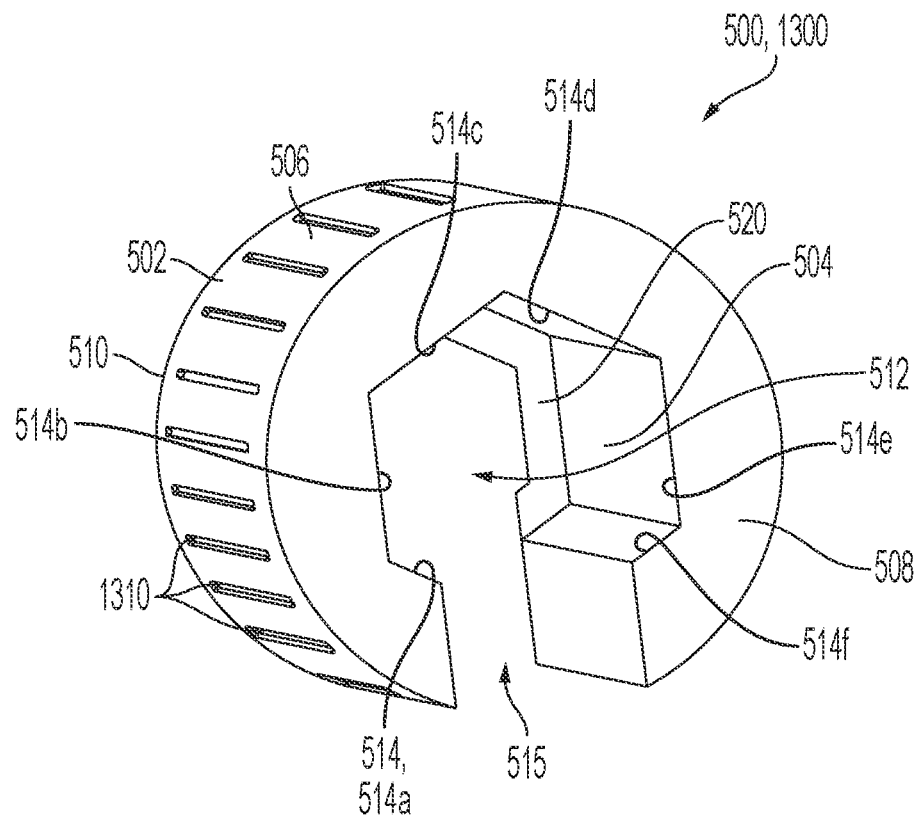
FIG. 13 is a perspective view of the manual tightening
adaptor in accordance with another aspect of the present
disclosure.

8 meter swivel nut 130, if the meter swivel nut 130 cannot be manually tightened for any reason (e.g., the installer cannot physically reach the meter swivel nut 130). In other aspects, however, the adaptor portion 336 can define any other suitable cross-sectional shape, such as square or pentagonal for example and without limitation, provided that the adaptor portion 336 is configured to mate with the tightening adaptor 500. Moreover, in other aspects, the outer side faces 338 the adaptor portion 336 may not be substantially planar and/or the meter swivel nut 130 may not be compatible with a wrench. In other aspects, the adaptor portion 336 and/or the entire nut body 135 can be substantially rounded or cylindrical, as shown in the embodiments of FIGS. 12 and 13. In some aspects, the outer nut surface 334 can be textured to improve the grip on the outer nut surface 334, as shown in FIG. 13. For example, the outer nut surface 334 can be knurled, bumpy, ridged, rough, uneven, or otherwise textured, as described in further detail below.

Example aspects of the meter swivel nut 130 can be fitted with one or more tamper-prevention wires (not shown) to thwart inadvertent or intentional tampering with the meter swivel nut 130. As shown, the outer nut surface 334 can define a first pair of wire indentations 342 formed at a nut first side 346 of the meter swivel nut 130 and a second pair of wire indentations 344 formed at an opposite nut second side 348 of the meter swivel nut 130. The first pair of wire indentations 342 and the second pair of wire indentations 344 can be formed in the adaptor portion 336 of the meter swivel nut 130, proximate to the nut front end 234. Moreover, a wire hole 343 can extend through the nut body 135 between each of the first pair of wire indentations 342 and the second pair of wire indentations 344. The tamper-prevention wire(s) can be passed through each of the wire holes 343 and looped around the water meter register of the meter 120 (shown in FIG. 1) or other component(s) of the meter assembly 100 (shown in FIG. 1) to prohibit rotation of the meter swivel nut 130. In other aspects, either or both of the first and second pairs of wire indentations 342,344 can be formed in the meter swivel nut 130 at any other suitable location. Other aspects of the meter swivel nut 130 may not comprise the first and second pairs of wire indentations 342,344 and/or wire holes 343.

Figure 5:
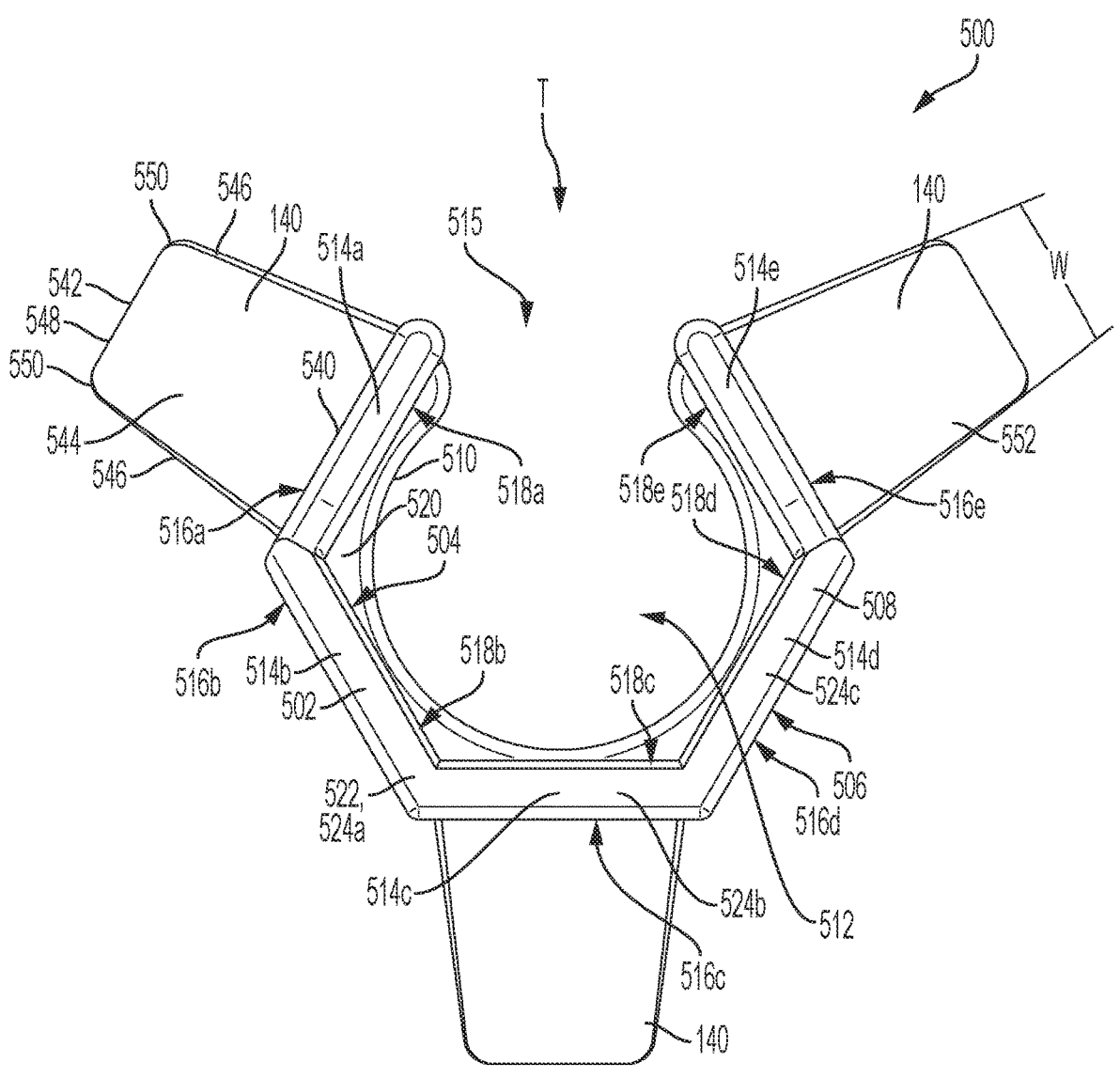
FIG. 5 is a front view of a manual tightening adaptor for
tightening the meter swivel nut, in accordance with another
aspect of the present disclosure.
Figure 6:
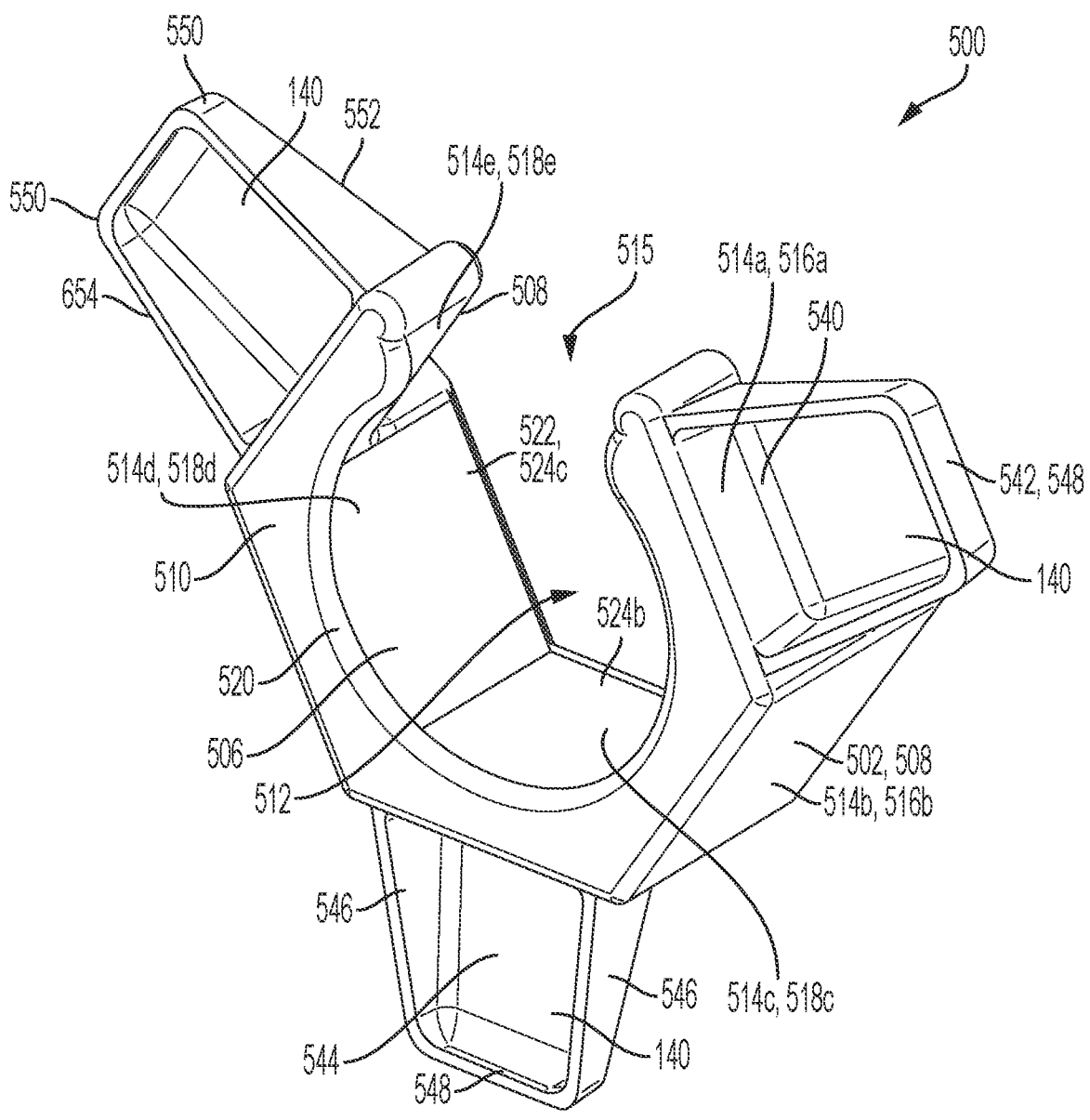
FIG. 6 is a rear perspective view of the manual tightening
adaptor of FIG. 5.

FIGS. 5 and 6 illustrate front and rear perspective views, respectively, of the tightening adaptor 500. Example aspects of the tightening adaptor 500 can comprise a plastic material. Other aspects of the tightening adaptor 500 can comprise any other suitable material, including metal materials, such as brass and stainless steel, and composite materials for example and without limitation, or any suitable combination of materials. Example aspects of the tightening adaptor 500 can be manufactured by an injection molding process (such as plastic injection molding), a 3D printing process, a casting process, or any other suitable manufacturing process. According to example aspects, the tightening adaptor 500 can comprise a central adaptor body 502 and a plurality of the handle spokes 140 extending radially outward from the adaptor body 502. In the present aspect, the tightening adaptor 500 can comprise three of the handle spokes 140. However, in other aspects, the tightening adaptor 500 can comprise more or fewer handle spokes 140. According to example aspects, the handle spokes 140 can be about equally spaced around the adaptor body 502. In some aspects, a width W of each of the handle spokes 140 can taper in a radially outward direction. That is, as shown, the width W of each handle spoke 140 can taper (i.e., decrease) generally from a proximal spoke end 540 of the handle spoke 140 coupled to the adaptor body 502 to a distal spoke end 542 of the handle spoke 140 opposite the proximal spoke end 540, as described in further detail with respect to FIG. 9. The handle spokes 140 of the present aspect can be substantially rectangular; however, in the other aspects, the handle spokes 140 can be more rounded. For example, in other aspects, the handle spokes 140 can be substantially semi-circular.

According to example aspects, each of the handle spokes 140 can define a spoke front wall 544 and a pair of opposing spoke side walls 546 extending from the proximal spoke end 540 to the distal spoke end 542. The spoke front wall 544 can be formed at a front spoke side 552 of the handle spoke 140. Each handle spoke 140 can further define a distal spoke end wall 548 at the distal spoke end 542 thereof. The distal spoke end wall 548 can meet the corresponding spoke side walls 546 at a pair of distal spoke corners 550. In example aspects, the distal spoke corners 550 can be curved or chamfered as shown. Referring to the rear perspective view of FIG. 6, in some aspects, each of the handle spokes 140 can be substantially hollowed out at a rear spoke side 654 thereof, opposite the front spoke side 552, to reduce material costs and to lessen the weight of the tightening adaptor 500. Thus, as shown, example aspects of the handle spokes 140 may not comprise a spoke rear wall 1040 (shown in FIG. 10) opposite the spoke front wall 544.

The adaptor body 502 can be substantially hexagonal in cross-sectional shape and can define an adaptor inner surface 504 and an adaptor outer surface 506 opposite the adaptor inner surface 504. In other aspects, the adaptor body 502 can define any other suitable cross-sectional shape, such as such as square or pentagonal for example and without limitation, provided that the tightening adaptor 500 is configured to mate with the meter swivel nut 130. The adaptor body 502 can further define an adaptor front end 508 and an adaptor rear end 510. The adaptor inner surface 504 can define an adaptor channel 512 extending centrally therethrough from the adaptor front end 508 to the adaptor rear end 510.

The substantially hexagonal adaptor body 502 can define five adaptor side walls 514a-e, and a gap 515 can be formed between the first and fifth adaptor side walls 514a,e. As shown, the gap 515 can extend lengthwise across the adaptor body 502 from the adaptor front end 508 to the adaptor rear end 510. Moreover, the gap 515 can allow transverse access into the adaptor channel 512, as indicated by directional arrow T. Thus, the substantially hexagonal adaptor body 502 does not define a sixth adaptor side wall between the first and fifth adaptor side walls 514a,e. The adaptor outer surface 506 can define five outer adaptor side faces 516a-e, each corresponding to one of the five adaptor side walls 514a-e. According to example aspects, each of the three handle spokes 140 can extend radially outward from one of the non-adjacent first, third, and fifth outer adaptor side faces 516a,c,e. In other aspects, any of the handle spokes 140 can extend from a different one of the five outer adaptor side faces 516a-e.

Additionally, the adaptor inner surface 504 can define five substantially planar inner adaptor side faces 518a-e, each corresponding to one of the five adaptor side walls 514a-e. At the adaptor rear end 510, the adaptor inner surface 504 can define a substantially annular adaptor flange 520 extending radially inward from the five inner adaptor side faces 518a-e. Additionally, at the adaptor front end 508, an adaptor lip 522 can extend axially forward from each of the second, third, and fourth adaptor side walls 514b,c,d to define corresponding first, second, and third lip walls 524a, b,c. In example aspects, the first, second, and third lip walls 524a,b,c can be extensions of the second, third, and fourth adaptor side walls 514b,c,d, respectfully, and can therefore considered as part of the second, third, and fourth adaptor side walls 514b,c,d.

According to example aspects, the tightening adaptor 500 can be mounted onto the standard type meter swivel nut 231 (shown in FIG. 2) by receiving the valve outlet portion 116 (shown in FIG. 1) of the meter valve 110 (shown in FIG. 1) through the gap 515 and sliding the tightening adaptor 500 forward towards the standard type meter swivel nut 231 mounted at the valve outlet end 218 (shown in FIG. 2). The tightening adaptor 500 can be slid over the standard type meter swivel nut 231 until the adaptor flange 520 of the tightening adaptor 500 abuts the substantially cylindrical extension portion 340 (shown in FIG. 3) at the nut rear end 236 (shown in FIG. 2). Furthermore, the five inner adaptor side faces 518a-e of the tightening adaptor 500 can substantially surround the substantially cylindrical extension portion 340 of the standard type meter swivel nut 231, and each of the three lip walls 524a,b,c of the tightening adaptor 500 can confront and engage a corresponding one of the six outer side faces 338 (shown in FIG. 3) of the adaptor portion 336 (shown in FIG. 3) of the meter swivel nut 130. The engagement of the lip walls 524a,b,c of the tightening adaptor 500 with the corresponding outer side faces 338 of the meter swivel nut 130 can rotate and advance the meter swivel nut 130 forward onto the meter inlet portion 125 (shown in FIG. 1) as the tightening adaptor 500 is rotated via the handle spokes 140. In some aspects, an installer can manually grip one or more of the handle spokes 140 to rotate the tightening adaptor 500. In other aspects, the installer can engage one or more of the handle spokes 140 with a tool to rotate the tightening adaptor 500. For example, in one particular example aspects, a distal pipe end of a hollow pipe can be slid over one of the handle spoke 140, and the installer can manually rotate the hollow pipe to rotate the tightening adaptor 500. Tightening the meter swivel nut 130 with the hollow pipe can be beneficial if increased torque is required to tighten or loosen the meter swivel nut 130 and/or if the meter swivel nut 130 is manually out of reach. The tapered width W of each handle spoke 140 can allow hollow pipes of varying inner diameters to snugly engage the handle spoke 140.

Figure 7:
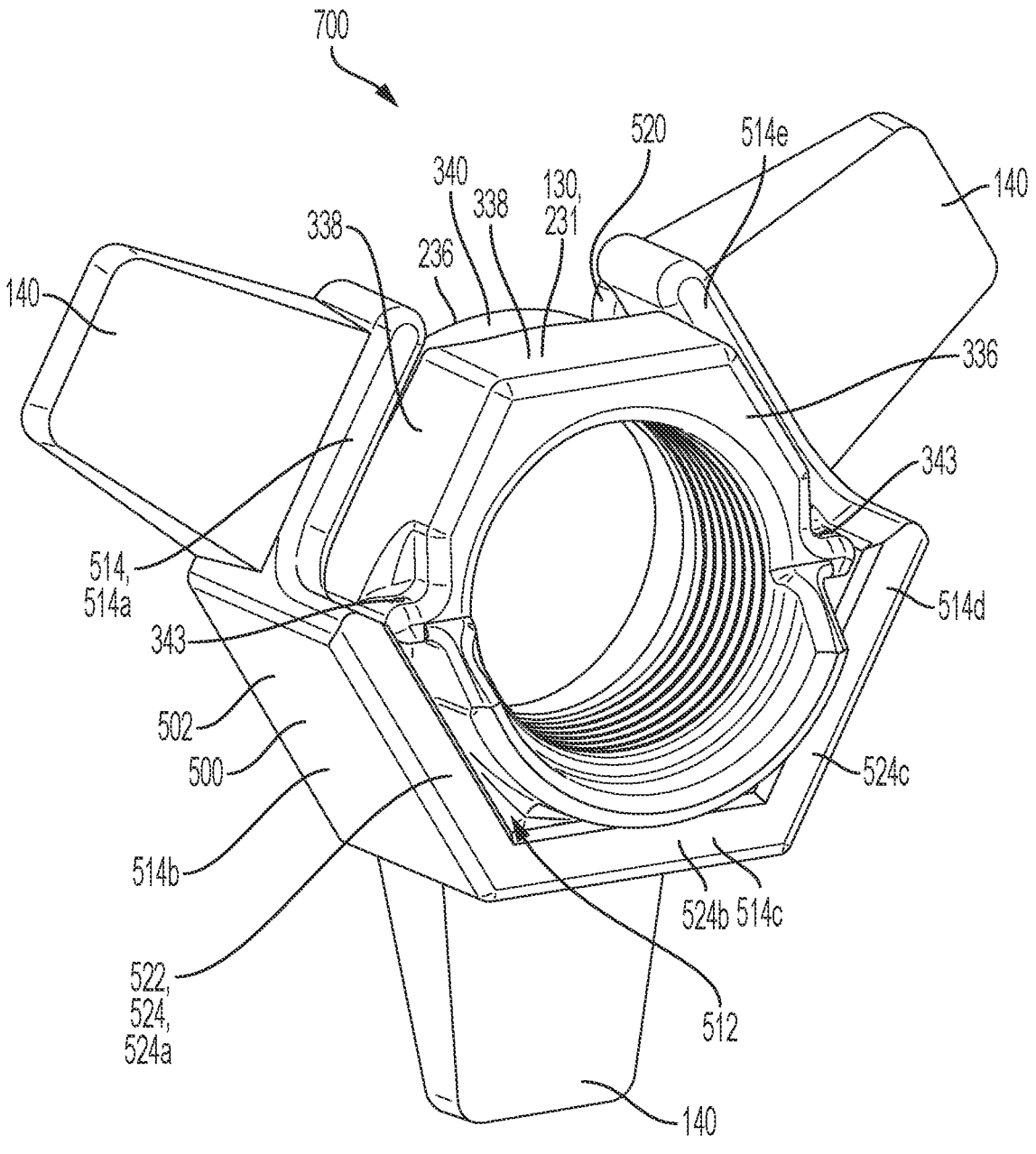
FIG. 7 is a front perspective view of the manual tightening
adaptor of FIG. 5 mounted on the meter swivel nut of FIG.
2.
Figure 8:
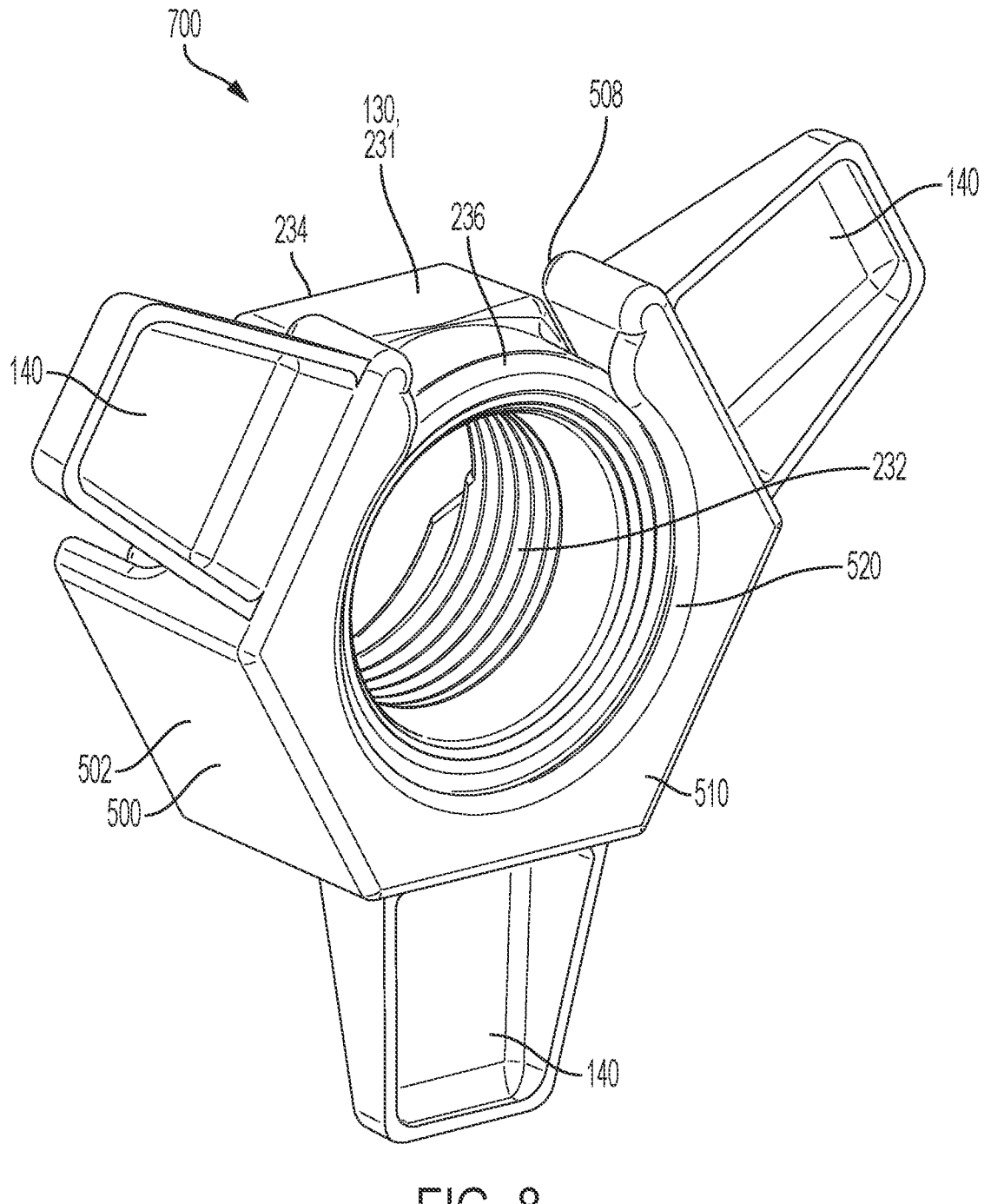
FIG. 8 is a rear perspective view of the manual tightening
adaptor of FIG. 5 mounted on the meter swivel nut of FIG.
2.

FIGS. 7 and 8 illustrate front and rear perspective views, respectively, of a spoked meter nut assembly 700 comprising the standard type meter swivel nut 231 and the tightening adaptor 500 mounted to the standard type meter swivel nut 231 of FIG. 2. The spoked meter nut assembly 700 can be considered as another example aspect of the spoked meter swivel nut 131. According to example aspects, a method of tightening the standard type meter swivel nut 231 can comprise sliding the tightening adaptor 500 over the meter swivel nut 130 to mount the tightening adaptor 500 on the meter swivel nut 130 and to dispose at least a least a portion of the meter swivel nut 130 within the adaptor channel 512. The tightening adaptor 500 can comprise a plurality of the adaptor side walls 514, and the meter swivel nut 130 can comprise a plurality of the outer side faces 338. The method can further comprise confronting a first one of the adaptor side walls 514 (e.g., a first one of the lip walls 524) of the tightening adaptor 500 with a first one of the outer side faces 338 of the meter swivel nut 130 and confronting a second one of the adaptor side walls 514 (e.g., a second one of the lip walls 524) with a second one of the outer side faces 338. In some aspects, the method can comprise abutting the adaptor flange 520 of the tightening adaptor 500 against the nut rear end 236 of the meter swivel nut 130.

A next step in the method can comprise engaging at least one of the handle spokes 140 of the tightening adaptor 500 and rotating the tightening adaptor 500, wherein rotating the tightening adaptor 500 can simultaneously rotate the meter swivel nut 130. In some aspects, engaging the at least one of the handle spokes 140 can comprise manually gripping the at least one of the handle spokes 140, and rotating the tightening adaptor 500 can comprise manually rotating the tightening adaptor 500. In some aspects, engaging the at least one of the handle spokes 140 can comprise receiving the at least one of the handle spokes 140 within a hollow pipe, and rotating the tightening adaptor 500 can comprise rotating the hollow pipe. In other aspects, the method may not comprise engaging at least one of the handle spokes 140, and the method instead can comprise engaging the adaptor body 502 with a tool, such as a wrench, and rotating the tightening adaptor 500 with the tool.

Figure 9:
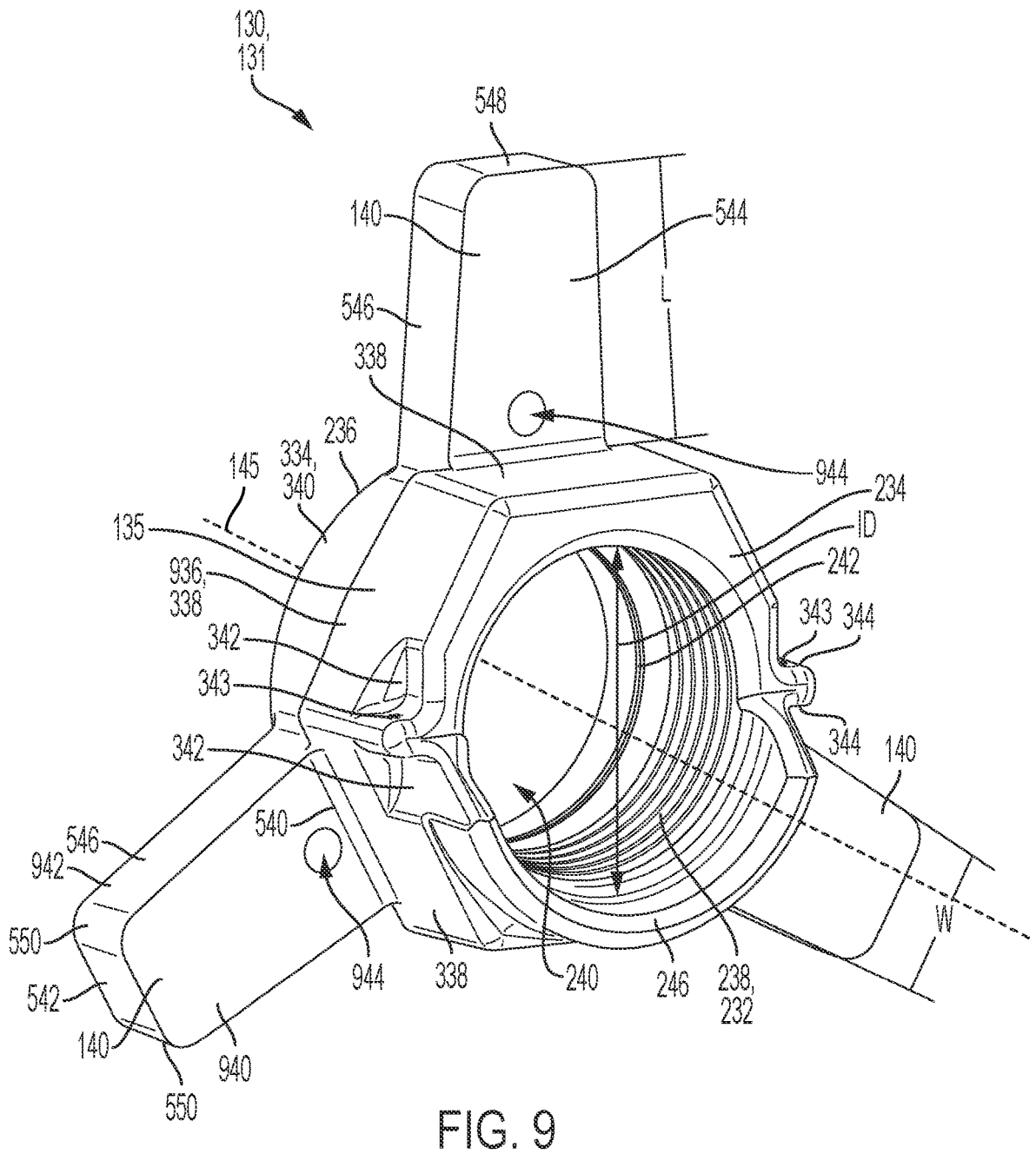
FIG. 9 is a front perspective view of the meter swivel nut,
in accordance with another aspect of the present disclosure.

FIG. 9 illustrates a front perspective view of the meter swivel nut 130 in accordance with another example aspect of the present disclosure. The meter swivel nut 130 can be the spoked meter swivel nut 131. According to example aspects, the handle spokes 140 can be formed monolithically with the nut body 135 of the meter swivel nut 130. The meter swivel nut 130 can define the nut front end 234 and the nut rear end 236. The inner nut surface 238 of the meter swivel nut 130 can define the nut bore 240 extending from the nut front end 234 to the nut rear end 236. The inner nut surface 238 can also define the annular ring groove 242 proximate to the nut rear end 236 and extending radially outward relative to the flow axis 145. Additionally, the internal threading 232 of the inner nut surface 238 can be defined between the nut front end 234 and the annular ring groove 242. The meter swivel nut 130 can also comprise the arcuate lip 246 extending axially forward from the nut front end 234.

The outer nut surface 334 can define the substantially cylindrical extension portion 340 adjacent to the nut rear end 236 and a substantially hexagonal body portion 936 extending between the substantially cylindrical extension portion 340 and the nut front end 234. The substantially hexagonal body portion 936, similar to the substantially hexagonal adaptor portion 336 (shown in FIG. 3), can define the six substantially planar outer side faces 338. In other aspects, the body portion 936 can define any other suitable cross-sectional shape, such as square, pentagonal, or even circular, for example and without limitation. In some aspects, the substantially hexagonal body portion 936 can also define the first and second pairs of wire indentations 342,344 and the wire holes 343. According to example aspects, the handle spokes 140 can extend radially outward from the outer nut surface 334. The meter swivel nut 130 can comprise three of the handle spokes 140 in the present aspect; however, in other aspects, the meter swivel nut 130 can comprise more or fewer handle spokes 140. The handle spokes 140 can extend from either or both of the substantially hexagonal body portion 936 and the substantially cylindrical extension portion 340. For example, in the present aspect, a forward portion 940 of each handle spoke 140 can extend radially outward from the substantially hexagonal body portion 936 and a rearward portion 942 of each handle spoke 140 can extend radially outward from the substantially cylindrical extension portion 340.

Each of the handle spokes 140 of the present aspect can comprise the spoke front wall 544, the pair of opposing spoke side walls 546, and the distal spoke end wall 548. The handle spokes 140 may be substantially hollowed out at the rear spoke side 654 (shown in FIG. 6) thereof to reduce material costs and to lessen the weight of the meter swivel nut 130. In other aspects, the handle spokes 140 may not be hollowed out. The distal spoke corners 550 can be curved or chamfered as previously described. Additionally, the width W of each of the handle spokes 140 can taper (i.e., decrease) in a radially outward direction, as previously described. In some aspects, each of the spoke side walls 546 can be drafted between about 1° and 30°. In other aspects, each of the spoke side walls 546 can be drafted greater than 30°. In other aspects, each of the spoke side walls 546 can be drafted less than 1° or the spoke side walls 546 may not be drafted at all (i.e., the width W of the handle spokes 140 may not be tapered).

In some example aspects, a substantially axial spoke opening 944 (relative to the flow axis 145) can be formed through each or any of the handle spokes 140. In the present aspect, the spoke opening 944 of each handle spoke 140 can be formed through the spoke front wall 544 adjacent to the proximal spoke end 540. In other aspects, the spoke opening 944 can be formed at any suitable location along a length L of the handle spoke 140. According to example aspects, a tamper-prevention wire can be fed through each of the spoke openings 944, and the wire tie can prevent inadvertent or intentional tampering with the meter swivel nut 130. Additionally, the spoke openings 944 can reduce the weight of the meter swivel nut 130. In aspects wherein the meter swivel nut 130 is manufactured by a casting process, the spoke openings 944 can be formed during casting, which can reduce material costs and/or manufacturing costs of the meter swivel nut 130. In other aspects, the spoke openings 944 can be drilled, punched, or otherwise formed after the meter swivel nut 130 is cast. Moreover, in some aspects, the spoke openings 944 formed through the handle spokes 944 can serve as finger openings that can be manually engaged by the installer to facilitate gripping and rotating the meter swivel nut 130.

Each of the handle spokes 140 can be equal for about equal in length to one another. According to example aspects, the length L of each handle spoke 140 from the proximal spoke end 540 to the distal spoke end 542 can be about equal to an inner diameter ID of the nut bore 240. Put another way, a ratio of the length L of each handle spoke 140 to the inner diameter ID of the nut bore 240 can be about 1:1. That is, for a meter swivel nut 130 having a nut bore 240 with an inner diameter ID of about 1", the length L of each handle spoke 140 can about 1". In other aspects, the length L of each handle spoke 140 can be greater or lesser than the inner diameter ID of the nut bore 240. For example, in some aspects, the ratio of the length L of each handle spoke 140 to the inner diameter ID of the nut bore 240 can be between about 1:2 and 3:2. That is, for a meter swivel nut 130 having a nut bore 240 with an inner diameter ID of about 1", the length L of each handle spoke 140 can be between about 0.5" and 1.5". In some aspects, the ratio of the length L of each handle spoke 140 to the inner diameter ID of the nut bore 240 can be between about 3:4 and 4:3. That is, for a meter swivel nut 130 having a nut bore 240 with an inner diameter ID of about 1", the length L of each handle spoke 140 can be between about 0.75" and 1.25".

While the example dimensions described herein correspond to the handle spokes 140 formed monolithically with the spoked meter swivel nut 131, the same example dimensions can also be characteristic of the handle spokes 140 formed with the tightening adaptor 500 (shown in FIG. 5). In other aspects, the dimensions of the handle spokes 140 of the tightening adaptor 500 may differ from the those of the handle spokes 140 formed monolithically with the spoked meter swivel nut 131.

Figure 10:
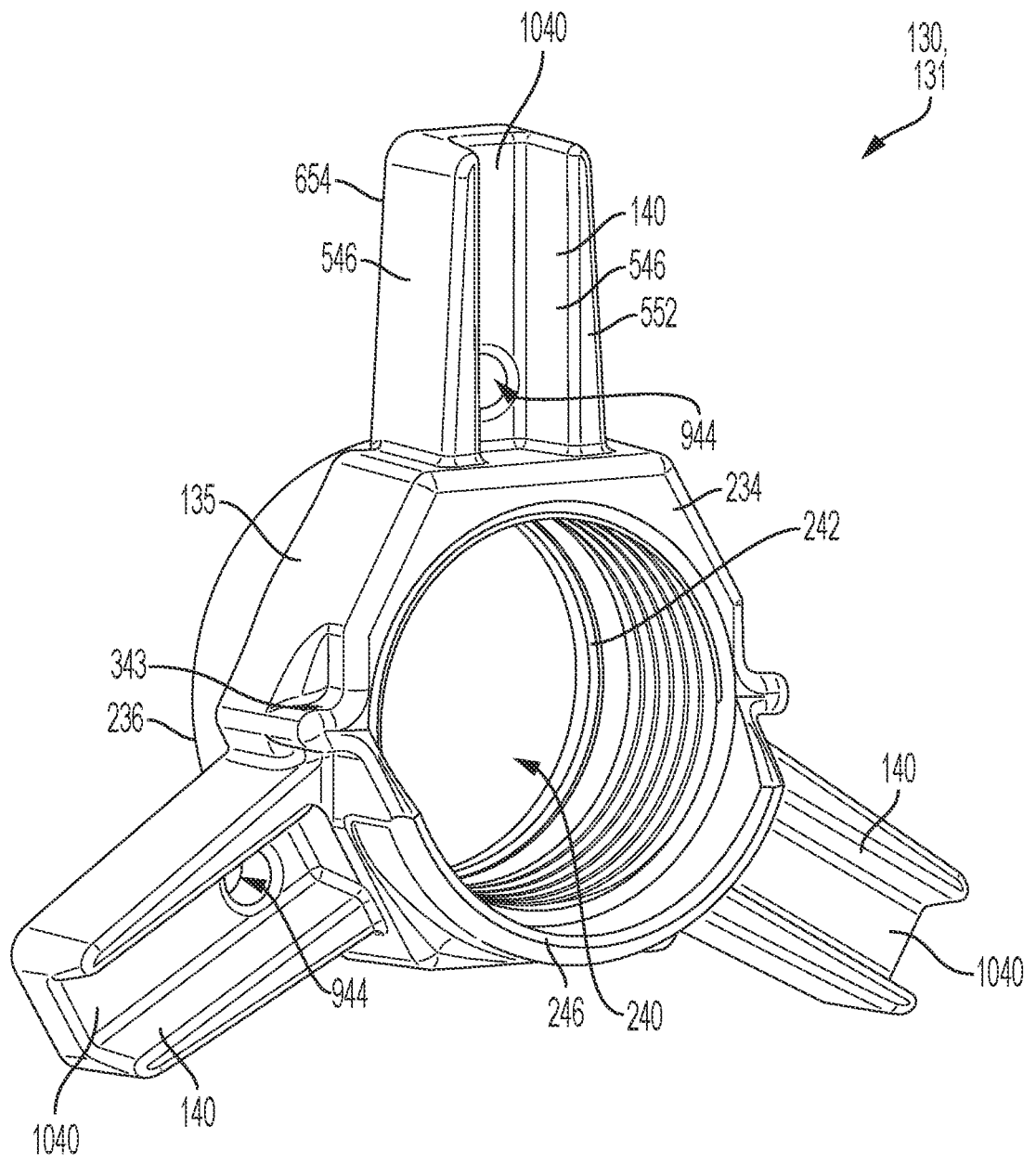
FIG. 10 is a front perspective view of the meter swivel nut
of FIG. 1.

FIG. 10 illustrates a front perspective view of the spoked meter swivel nut 131 in accordance with another example aspect of the present disclosure, wherein the handle spokes 140 again can be formed monolithically with the nut body 135 of the meter swivel nut 130. The meter swivel nut 130 of the present aspect can be substantially similar to the meter swivel nut 130 of the FIG. 9. However, in the present aspect, each of the handle spokes 140 can comprise the spoke side walls 546 and the spoke rear wall 1040 only. Each of the handle spokes 140 can be substantially hollowed out at the front spoke side 552 thereof and does not comprise either the spoke front wall 544 (shown in FIG. 5) nor the distal spoke end wall 548 (shown in FIG. 5). The spoke opening 944 of each handle spoke 140 can extend axially through the corresponding spoke rear wall 1040.

Figure 11:
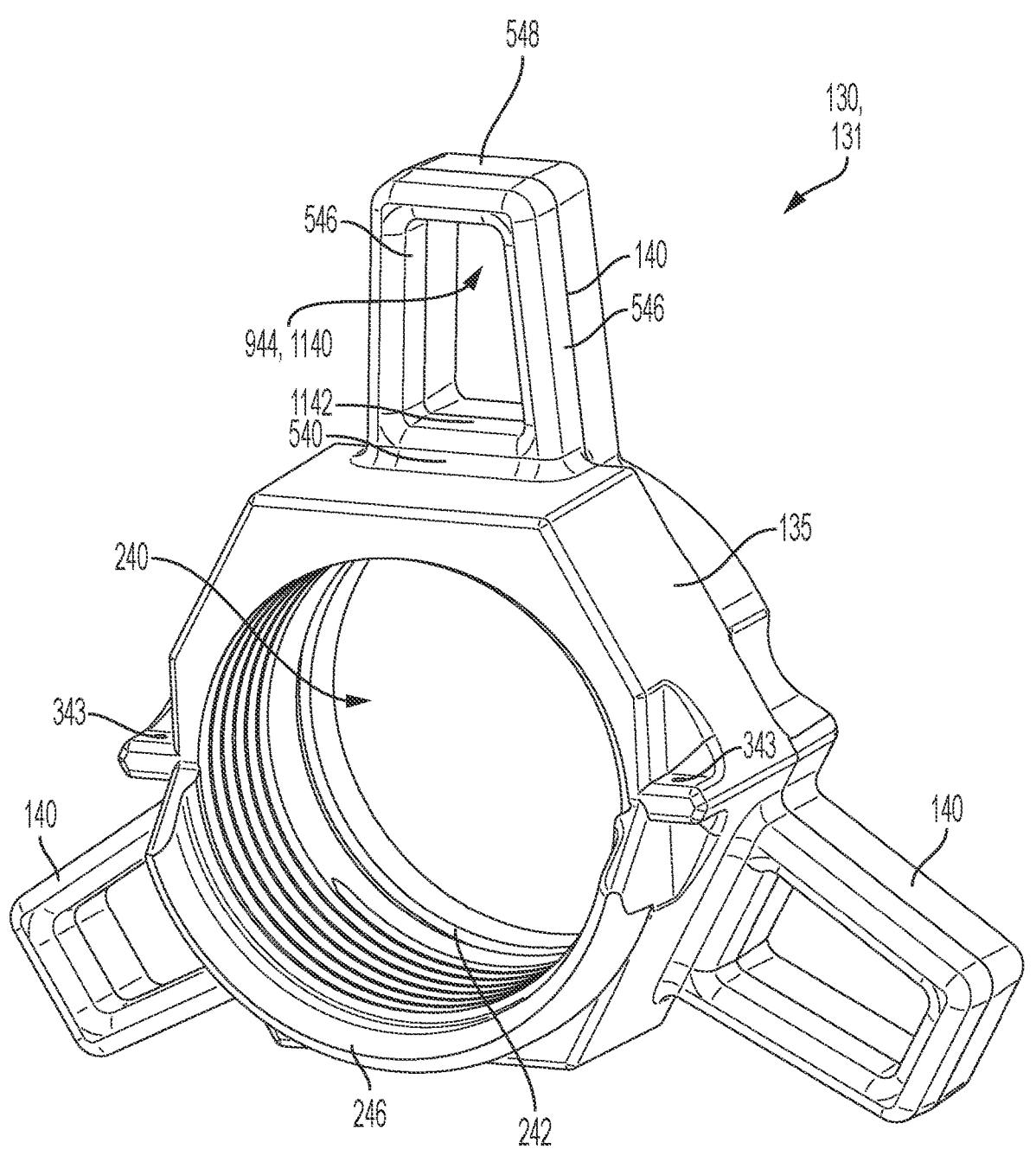
FIG. 11 is a front perspective view of the meter swivel
nut, in accordance with another aspect of the present dis-
closure.

FIG. 11 illustrates a front perspective view of the spoked meter swivel nut 131 in accordance with another example aspect of the present disclosure, wherein the handle spokes 140 again can be formed monolithically with the nut body 135 the meter swivel nut 130. The meter swivel nut 130 of the present aspect can be substantially similar to the meter swivel nuts 130 of the FIGS. 9 and 10. However, in the present aspect, each of the handle spokes 140 can comprise the spoke side walls 546 and the distal spoke end wall 548 only. Each of the handle spokes 140 can be substantially hollowed out through a spoke center 1140 thereof and does not comprise either the spoke front wall 544 (shown in FIG. 5) nor the spoke rear wall 1040 (shown in FIG. 10). In some aspects, each of the handle spokes 140 can further comprise a proximal spoke end wall 1142 extending between the spoke side walls 546 at the proximal spoke end 540; however, other aspects may not comprise the proximal spoke end wall 1142. The spoke opening 944 of each handle spoke 140 can be formed integrally with the hollowed-out spoke center 1140 of the handle spoke 140, as shown. Again, in some aspects, the spoke openings 944 can serve as finger openings that can be manually engaged by the installer to facilitate gripping and rotating the meter swivel nut 130.

FIG. 12 illustrates a front perspective view of the spoked meter swivel nut 131 in accordance with another example aspect of the present disclosure, wherein the handle spokes 140 again can be formed monolithically with the nut body 135 of the meter swivel nut 130. In the present aspect, the meter swivel nut 130 does not define the substantially hexagonal body portion 936 (shown in FIG. 9) nor the substantially cylindrical extension portion 340 (shown in FIG. 9). The meter swivel nut 130 furthermore does not define the arcuate lip 246 (shown in FIG. 9) extending axially forward from the nut front end 234. Rather, the nut body 135 of the meter swivel nut 130 can be substantially cylindrical in shape from the nut front end 234 to the nut rear end 236. The inner nut surface 238 of the meter swivel nut 130 can define the internal threading 232 proximate to the nut front end 234 and the annular ring groove 242 proximate to the nut rear end 236. In some aspects, the first pair of wire indentations 342 and corresponding wire hole 343 can be formed in the substantially cylindrical nut body 135 at the nut first side 346 of the meter swivel nut 130, and the second pair of wire indentations 344 and corresponding wire hole 343 can be formed in the substantially cylindrical nut body 135 at the opposite nut second side 348 of the meter swivel nut 130.

The meter swivel nut 130 of the present aspect can comprise only two of the handle spokes 140. In other aspects, the meter swivel nut 130 can comprise more or fewer handle spokes 140. A first one of the handle spokes 140a can extend from the nut body 135 at the nut first side 346 of the meter swivel nut 130, adjacent to the first pair of wire indentations 342 and the corresponding wire hole 343. A second one of the handle spokes 140b can extend from the nut body 135 at the nut second side 348 of the meter swivel nut 130, adjacent to the second pair of wire indentations 344 and the corresponding wire hole 343, and directly opposite the first one of the handle spokes 140a. In other aspects, the first handle spoke 140a can extend from the nut body 135 at the top nut end 332, and the second handle spoke 140b can extend from the nut body 135 at the bottom nut end 330. In other aspects, the first and second handle spokes 140a,b can extend from any suitable opposing locations on the nut body 135. Each of the handle spokes 140 can be substantially solid, as illustrated, or the handle spokes 140 can be hollowed out or partially hollowed out, as previously described. Additionally, the spoke openings 944 (shown in FIG. 9) are not shown in the present aspect of the meter swivel nut 130, but in other aspects, the spoke openings 944 can be defined through the handle spokes 140.

FIG. 13 illustrates another example aspect of the tightening adaptor 500. In the present aspect, the adaptor body 502 can be substantially cylindrical in shape and can define an adaptor front end 508 and an adaptor rear end 510. The adaptor body 502 can define six of the adaptor side walls 514a-f, and the gap 515 can be formed between the first and sixth adaptor side walls 514a,f. A width of the first and sixth adaptor sidewalls 514a,f can thereby be shortened compared to the remaining adaptor side walls 514b-e. The adaptor channel 512 can extend centrally through the tightening adaptor 500 from the adaptor front end 508 to the adaptor rear end 510. Additionally, the adaptor flange 520 can extend radially inward at the adaptor rear end 510.

The tightening adaptor 500 of the present aspect does not comprise the handle spokes 140 (shown in FIG. 1). Rather, the adaptor outer surface 506 can be textured to improve the installer's manual grip (or the grip of a tightening tool) on the adaptor outer surface 506. For example, in the present aspect, the adaptor outer surface 506 can be knurled to define a plurality of substantially axial cuts 1310. In other aspects, the cuts 1310 may form a crisscross pattern or any other suitable pattern. In other aspects, the adaptor outer surface 506, can be bumpy, ridged, rough, uneven, or otherwise textured to provide an improved grip on the adaptor outer surface 506.

Figure 14:
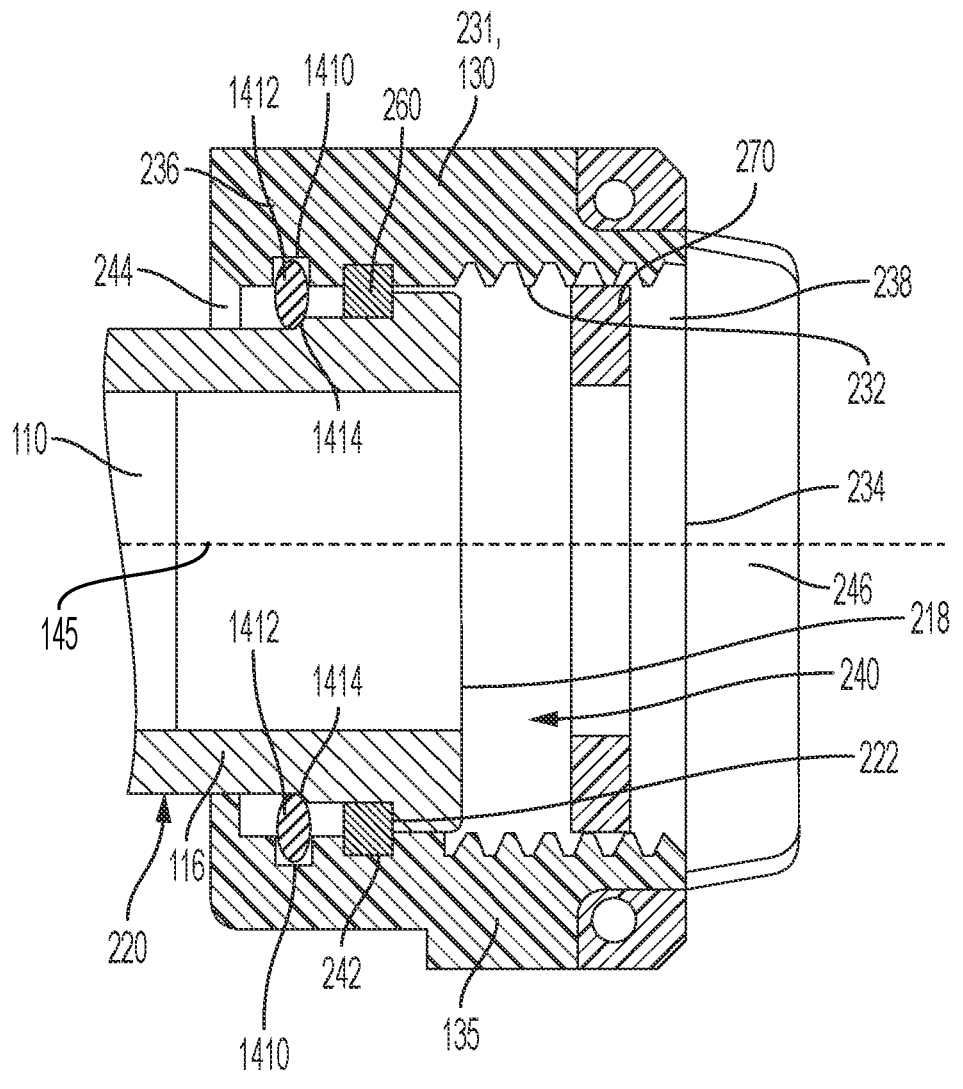
FIG. 14 is a cross-sectional view of the meter swivel nut
mounted to the meter valve according to another example
aspect of the present disclosure, the cross-sectional taken
along a line similar in orientation to line 2-2 of FIG. 1.

FIG. 14 is a cross-sectional view of the meter swivel nut 130 according to another example aspect of the disclosure. The cross-sectional view can be taken along a line similar in orientation to the line 2-2 shown in FIG. 1. As shown, the meter swivel nut 130 can be mounted on the valve outlet end 218 of the meter valve 110 for connecting the valve outlet end 218 to the meter inlet portion 125 of the meter 120 (both shown in FIG. 1). The meter swivel nut 130 can define the nut front end 234 and the nut rear end 236 opposite the nut front end 234. The curved or arcuate lip 246 can extend axially forward from the nut front end 234, as shown The inner nut surface 238 of the nut body 135 can define the nut bore 240 extending therethrough from the nut front end 234 to the nut rear end 236. The valve outlet end 218 of the meter valve 110 can extend into the nut bore 240 at nut rear end 236, and the meter swivel nut 130 can be secured to the valve outlet end 218 by the snap ring 260. The meter valve 110 can define the outer valve surface 220.

The snap ring 260 can substantially encircle the meter valve 110 proximate to the valve outlet end 218, and the outer valve surface 220 can define the stop shoulder 222 at the valve outlet end 218 to prevent the snap ring 260 from sliding off the valve outlet end 218. The inner nut surface 238 of the meter swivel nut 130 can define the annular ring groove 242, and the snap ring 260 can engage the annular ring groove 242 to retain the meter swivel nut 130 on the valve outlet end 218 of the meter valve 110. In some aspects, the inner nut surface 238 can further define the annular chamfer 244 at the nut rear end 236 to facilitate inserting the valve outlet end 218 into the nut bore 240. Additionally, the inner nut surface 238 can define the internal threading 232.

In the present aspect, the inner nut surface 238 can further define an annular packing groove 1410 arranged between the annular ring groove 242 and the nut rear end 236. More specifically, the annular packing groove 1410 can be arranged between the annular ring groove 242 and the annular chamber 244. A packing 1412, such as an O-ring 1412 for example and without limitation, can be received within the annular packing groove 1410 and can engage and seal with the outer valve surface 220 of the meter valve 110. In some aspects, the outer valve surface 220 of the meter valve 110 can define a sealing shoulder 1414 at or near the valve outlet portion 116, and the O-ring 1412 can engage and seal with a sealing shoulder 1414. In example aspects, the O-ring 1412 can aid in maintaining the alignment of the meter swivel nut 130 with the flow axis 145.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A spoked swivel nut comprising:
a nut body defining an inner nut surface, an outer nut surface, a nut front end, and a nut rear end opposite the nut front end, the inner nut surface defining a nut bore extending from the nut front end to the nut rear end, the inner nut surface further defining an annular ring groove proximate to the nut rear end and internal threading proximate to the nut front end, the outer nut surface defining a substantially hexagonal body portion, the substantially hexagonal body portion defining six substantially planar outer side faces; and
a tightening adapter comprising an adapter body engaging the substantially hexagonal body portion of the nut body and a plurality of manually-engageable hand spokes extending radially outward from the adapter body.

2. The spoked swivel nut of claim 1, wherein a ratio of a length of each of the manually-engageable handle spokes to an inner diameter of the nut bore is between about 1:2 and 3:2.

3. The spoked swivel nut of claim 2, wherein the ratio of the length of each of the manually-engageable handle spokes to the inner diameter of the nut bore is about 1:1.

4. The spoked swivel nut of claim 2, wherein:
each of the manually-engageable handle spokes defines a proximal spoke end coupled to the nut body and a distal spoke end opposite the proximal spoke end; and
a width of each of the manually-engageable handle spokes tapers in a radially outward direction from the proximal spoke end to the distal spoke end.

5. The spoked swivel nut of claim 4, wherein:
each of the manually-engageable handle spokes define a first side wall and a second side wall opposite the first side wall;
each of the first side wall and the second side wall extend from the proximal spoke end to the distal spoke end; and
a draft angle of each of the first side wall and the second side wall is between about 1° and 30°.

6. The spoked swivel nut of claim 1, wherein the nut body further defines an arcuate lip extending axially forward from the nut front end and at least partially encircling the nut bore.

7. The spoked swivel nut of claim 1, wherein each of the manually-engageable handle spokes are formed monolithically with the adapter body, and wherein each of the manually-engageable handle spokes extends radially outward from the adapter body.

8. The spoked swivel nut of claim 1, wherein each of the plurality of manually-engageable handle spokes defines a nut opening extending axially therethrough, each of the nut openings configured to receive a tamper-prevention wire.

9. The spoked swivel nut of claim 1, wherein the nut body is substantially cylindrical.

10. The spoked swivel nut of claim 9, wherein the outer nut surface of the nut body is textured to improve a grip on the outer nut surface.

11. The spoked swivel nut of claim 1, wherein:
the inner nut surface further defines an annular packing groove between the annular ring groove and the nut rear end; and
a packing is disposed within the annular packing groove.

12. A meter valve assembly comprising:
a meter valve defining an inlet end and an outlet end opposite the inlet end; and
a spoked meter swivel nut mounted to the outlet end of the meter valve and comprising a nut body and a plurality of manually-engageable handle spokes, the nut body defining an inner nut surface and an outer nut surface, the inner nut surface defining a nut bore extending from a nut front end to a nut rear end, the outlet end of the meter valve engaging the nut bore at the nut rear end, the plurality of manually-engageable handle spokes extending radially outward from the nut body;

wherein the manually-engageable handle spokes are configured to be manually gripped to rotate the spoked meter swivel nut on the outlet end of the meter valve;

the inner nut surface defines an annular ring groove proximate to the nut rear end;

the meter valve assembly further comprises a snap ring mounted on and extending around an outlet portion of the meter valve, proximate to the outlet end; and the snap ring engages the annular ring groove to couple the spoked meter swivel nut to the meter valve at the outlet end.

13. The meter valve assembly of claim 12, wherein:

the inner nut surface further defines an annular packing groove between the annular ring groove and the nut rear end;

the meter valve defines a sealing shoulder at the outlet portion; and a packing is disposed within the annular packing groove and seals with the sealing shoulder of the meter valve.

14. The meter valve assembly of claim 12, wherein the meter valve defines an outer valve surface, the outer valve surface defines an annular stop shoulder proximate to the outlet end of the meter valve, and the annular stop shoulder confronts the snap ring to prevent the snap ring from sliding off the outlet end.

15. The meter valve assembly of claim 12, wherein the inner nut surface further defines internal threading proximate to the nut front end, the internal threading configured to mate with external threading formed on a meter.

16. The meter valve assembly of claim 15, wherein the nut body further defines an arcuate lip extending axially forward from the nut front end and at least partially encircling the nut bore.

17. The meter valve assembly of claim 15, wherein each of the manually-engageable handle spokes defines a nut opening extending axially therethrough, each of the nut openings configured to receive a tamper-prevention wire.

18. The spoked meter swivel nut of claim 15, wherein the outer nut surface of the nut body defines a substantially hexagonal body portion proximate to the nut front end and a substantially cylindrical extension portion proximate to the nut rear end, and wherein the substantially hexagonal body portion defines six substantially planar outer side faces.

19. The meter valve assembly of claim 15, wherein a ratio of a length of each of the manually-engageable handle spokes to an inner diameter of the nut bore is between about 1:2 and 3:2.

20. The meter valve assembly of claim 19, wherein:

each of the manually-engageable handle spokes defines a proximal spoke end coupled to the nut body and a distal spoke end opposite the proximal spoke end; and a width of each of the manually-engageable handle spokes tapers in a radially outward direction from the proximal spoke end to the distal spoke end.

21. A method of coupling a meter valve to a meter comprising:

obtaining a spoked meter swivel nut comprising a nut body defining a substantially hexagonal body portion and a tightening adapter comprising an adaptor body engaging the substantially hexagonal body portion, the tightening adapter comprising at least one manually-engageable hand spoke extending radially outward from the adapter body;

mounting the spoked meter swivel nut to a valve outlet end of the meter valve, the valve outlet end engaging a nut bore of the spoked meter swivel nut at a nut rear end of the spoked meter swivel nut;

receiving a meter inlet end of the meter within the nut bore at a nut front end of the spoked meter swivel nut opposite the nut rear end, wherein the meter inlet end defines external threading configured to mate with internal threading of the spoked meter swivel nut;

manually gripping at least one manually-engageable handle spoke of the spoked meter swivel nut; and manually rotating the spoked meter swivel nut to tighten the spoked meter swivel nut on the meter inlet end of the meter;

wherein:

the nut bore defines an annular ring groove proximate to the nut rear end;

the meter valve comprises a snap ring mounted on and extending around the valve outlet end; and the snap ring engages the annular ring groove to couple the spoked meter swivel nut to the meter valve at the valve outlet end.

* * * * *